United States Patent [19]

Inoue

[11] 4,436,976
[45] Mar. 13, 1984

[54] ELECTROEROSION MACHINING METHOD AND APPARATUS WITH AUTOMATIC VIBRATIONS-SENSING ELECTRODE WEAR COMPENSATION

[75] Inventor: Kiyoshi Inoue, Tokyo, Japan

[73] Assignee: Inoue-Japax Research Incorporated, Yokohama, Japan

[21] Appl. No.: 314,432

[22] Filed: Oct. 23, 1981

[30] Foreign Application Priority Data

Oct. 27, 1980 [JP] Japan .................. 55-149368

[51] Int. Cl.$^3$ .............. B23P 1/00; B23P 1/12
[52] U.S. Cl. ................ 219/69 V; 219/69 G; 219/69 M
[58] Field of Search ........... 219/69 V, 69 C, 69 M, 219/69 G; 73/580

[56] References Cited

U.S. PATENT DOCUMENTS 3,591,761 7/1971 Bederman et al. ............ 219/69 C
4,365,133 12/1982 Inoue ......................... 219/69 C

FOREIGN PATENT DOCUMENTS 4540405 12/1970 Japan ......................... 219/69 V Primary Examiner—B. A. Reynolds
Assistant Examiner—Alfred S. Keve
Attorney, Agent, or Firm—Karl F. Ross; Herbert Dubno

[57] ABSTRACT

An electroerosion method and apparatus for machining a workpiece, especially a 3D (three-dimensional) cavity therein, with a wire or rod electrode displaced multi-axially, wherein the tool electrode or a part thereof is vibrated transversely to the axis thereof at a resonant frequency thereof by an electro-mechanical vibrator. A transducer converts the mechanical vibrations into a corresponding electrical signal, and a detection circuit detects a change of the signal from the tranducer caused by a shift from the resonant condition which is produced by erosive wear of the vibrating part of the tool electrode. The detection circuit controls, through a driver circuit, an electrode driving motor in a manner such as to control the machining gap between the machining face of the electrode and the workpiece at a desired value. Where the wear of the electrode results in a reduction in the free, vibratable length of the electrode, the vibrator frequency is varied to compensate for the reduction in length of the free, vibratable length of the electrode.

22 Claims, 2 Drawing Figures

ELECTROEROSION MACHINING METHOD AND APPARATUS WITH AUTOMATIC VIBRATIONS-SENSING ELECTRODE WEAR COMPENSATION

FIELD OF THE INVENTION

The present invention relates in general to the electroerosive machining of a conductive workpiece with a tool electrode and in particular to an improved electroerosion machining method and apparatus which are capable of precisely ascertaining the wear of the tool electrode, thereby permitting the erosive machining process to progress in the workpiece while automatically compensating for the tool wear.

BACKGROUND OF THE INVENTION

In electroerosive machining, the term herein used to refer to a machining method which involves the removal of material from a conductive workpiece at least in part by the action of electrical discharges, a tool electrode is spacedly juxtaposed with the workpiece across a machining gap flooded with a machining liquid and an erosion machining current, commonly in the form of a succession of electrical pulses, is passed between the tool electrode and the workpiece. Successive electrical discharges are thus produced across the liquid flooded machining gap to electroerosively remove material from the workpiece. As material removal proceeds, the total electrode supported by a tool head is advanced by a servo system to maintain the machining gap which tends to enlarge substantially constantly.

In the erosion process, the erosive wear of the machining face of the tool electrode may simultaneously occur. While various techniques such as "shaping" the erosive pulses individually or in groups, controlling the liquid delivery into the machining gap and the use of a particular electrode material have been found to be effective to minimize the erosive wear of the tool electrode or to achieve what is called the "no wear" mode, tool wear is nevertheless unavoidable in certain grades of machining operation such as finishing or microfinishing and should even be produced positively in such and other machining operations in the interest of achieving an increased machining efficiency. The particular kind of erosive machining which makes the "wear" mode operation unavoidable or even desirable makes use of a tool electrode which is typically slender and of simple cross section, e.g. a wire electrode or rod electrode of circular or square cross-sectional shape, for machining a large and/or intricate three-dimensional cavity in the workpiece. The cavity is then formed in the workpiece by controlledly displacing the tool electrode relative to the workpiece multi-axially in a three-dimensional coordinate system along a prescribed set of movement paths which determines the contour of the desired cavity.

In those machining operations which advantageously entail the "wear" mode, it will be apparent that it becomes critically important to precisely ascertain the wear of the electrode machining face on an instantaneous basis so as to allow the machining gap to be optimally maintained.

It has been recognized, however, that the rate of wear of the tool electrode depends upon a variety of machining factors which include the tool material and configuration, the selected parameters of the erosive pulses and the particular kind of the machining liquid and its particular manner of supply to the gap region. They also include the instantaneous machining depth and the configuration of machined portions as well as their physical interactions with the flows of the machining liquid which may vary instantaneously. In practice, therefore, such a large number of intricate factors cannot be correlated to precisely ascertain the rate of tool wear or to prepare an adequate program for a control system designed to advance the tool electrode in such a manner as to accurately compensate for the actual tool wear. Even an empirical program based upon an individual trial machining operation can hardly be obtained. The conventional approach taken to ascertain the tool wear is, therefore, on an in-process basis which monitors and analyzes the state of erosive discharges. For example, the ratio of the number of no-load pulses or arcing pulses to the total number of pulses applied per unit time, the discharge initiation voltage or the gap impedance has been measured and the electrode servo system arranged to controlledly advance the tool electrode so as to maintain any one of these variables at a given constant value.

The discharge state, however, does not exclusively represent the physical size of the machining gap but also reflect on the degree of contamination of the machining liquid, the machining pulse conditions and other gap variables generally and it has been found to be practically impossible to extract therefrom information exclusively relevant to the physical magnitude of the machining gap. Thus, a state in which satisfactory discharges continue does not always represent the machining gap as being of a selected size and it is altogether possible that a continuation of satisfactory discharges does not yield a desired machining accuracy.

OBJECTS OF THE INVENTION

It is an important object of the present invention to provide an improved method of and apparatus for electroerosively machining a workpiece with a tool electrode whereby wear of the tool electrode can be precisely ascertained on an in-process basis to enable the wear to be automatically compensated for in consecutively machining the workpiece to from a desired cavity therein, especially but not exclusively by multi-axially displacing the tool electrode relative to the workpiece.

Another important object of the invention is to provide an improved electroerosive machining method and apparatus of the type described which are capable of positioning the machining face of a tool electrode tending to wear erosively precisely spaced with a given distance from the workpiece being erosively machined.

A further object of the invention is to provide an improved method and apparatus of the type described with a simplified means for advancing the tool electrode relative to the workpiece accurately so as to maintain the size of the machining gap therebetween substantially constant.

Yet a further object of the invention is to provide a novel method of and apparatus for accurately acertaining wear of the tool electrode in an electroerosive machining process, especially of a multi-axial displacement type, which method and apparatus permit a factor pertaining to the tool wear to be precisely subtracted from the analysis of an electrical discharge condition in the machining gap, thereby enabling other machining factors such as the degree of contamination of the machining liquid therein to be precisely ascertained whereby to obtain an increased machining accuracy in a given machining operation.

SUMMARY OF THE INVENTION

In accordance with the present invention there is provided in a first space thereof, a method of electroerosively machining a workpiece with a tool electrode, which method comprises the steps of: supporting the tool electrode to bring its free end portion defining a machining electrode face (i.e. a machining face of the electrode) into spaced juxtaposition with the workpiece and to define a machining gap therewith: flooding the machining gap with a machining liquid; causing the free end portion of the tool electrode to transversely vibrate at a given frequency; passing an erosion machining current between the tool electrode and the workpiece to electroerosively remove material from the workpiece while permitting the said machining electrode face to erosively wear; and sensing the erosive wear of the tool electrode by sensing a change in the mode of the vibration.

Specifically, the tool electrode is supported to present the aforesaid free end portion of a predetermined length which is caused to vibrate at the aforesaid frequency being a resonant frequency thereof.

The frequency of the vibrations at which the free end portion of the tool electrode is caused to vibrate is preferably in excess of 0.5 MHz and more preferably in excess of 10 MHz.

Specifically, the method according to the invention may further include the step of automatically advancing the tool electrode relative to the workpiece in response to the change in the aforesaid vibrations to maintain the machining gap substantially constant in size.

The invention also provides in a second aspect thereof, an apparatus for electroerosively machining a workpiece with a tool electrode, which apparatus comprises: a tool head for supporting the tool electrode to bring its free end portion defining a machining electrode face into spaced juxtaposition with the workpiece and to define a machining gap therewith; means for flooding the machining gap with a machining liquid; means for causing the free end portion of the tool electrode to transversely vibrate at a given frequency; power-supply means for passing an erosion machining current between the tool electrode and the workpiece to electroerosively remove material from the workpiece while permitting the machining electrode face to erosively wear; and electrode-wear sensing means for sensing a change in the mode of vibrations caused by the wear of the machining electrode face.

Specifically, the sensing means may comprise a transducer for converting the vibrations of the free end portion into a corresponding electrical signal and means for detecting a disturbance or disappearance of the signal from the transducer caused by the wear of the machining electrode face.

Machining feed drive means may be provided for relatively displacing the tool head and the workpiece three-dimensionally in a three-dimensional coordinate system along a prescribed path defining the contour of a desired cavity to be machined in the workpiece. The three-dimensional coordinate system may be an orthogonal coordinate system which includes a first coordinate axis in parallel or coincidence with the axis of the tool electrode and second and third mutually orthogonal coordinate axes orthogonal to the first coordinate axis. The machining feed drive means then comprises three independent drive motors adapted to move the tool head relative to the workpiece along the first, second and third coordinate axes, respectively. A numerical control unit may be provided for furnishing the three drive motors with respective drive signals to allow the machining electrode face on the free end portion of the tool electrode to move along the prescribed three-dimensional path preprogrammed therein.

The tool electrode may be in the form of a continuous elongate tool such as a wire, terminating at the aforesaid free end portion. Such a tool, composed of, say, copper or a copper alloy, may be of a diameter or thickness in the range of 0.05 to 1 mm and may be supported by the tool head to be movable axially relative to the tool head and to present the free end portion of a predetermined length for permitting the latter to transversely vibrate at the aforesaid given frequency being a resonant frequency thereof. Electrode feed drive means may be provided independently of the machining feed drive means and may operate, when the detecting means detects a disturbance or disappearance of the signal from the transducer, to automatically advance the tool along the aforesaid first coordinate axis by a predetermined distance or until the disturbance of the signal disappears or the original resonant vibration mode is re-established. This allows the machining electrode face to be renewed on the free end portion of the tool at a precise position established by movement of the tool head relative to the workpiece in the first coordinate axis by means of the first machining feed drive motor. This also allows the aforementioned predetermined length of the free end portion of the tool presented from the tool head to be automatically resumed, and hence a resumption of a correct machining gap size.

Alternatively, the tool electrode may be securely held by the tool head and may be of any simple form but preferably a slender body such as a wire or rod. As the tool electrode wears, the free end portion vibratably extended from the tool head is reduced in length, causing its resonant vibration frequency or mode to change. Multiple settings may be provided in the detector means to respond to a change from one preset resonant mode to another and the flange machining feed drive motor may be operated in response to each such change to advance the tool electrode axially relative to the workpiece along the first coordinate axis by a predetermined distance.

BRIEF DESCRIPTION OF THE DRAWING

These and other features of the present invention as well as the advantages thereof will become more readily apparent from the following description of certain preferred embodiments thereof taken with reference to the accompanying drawing in which.

SPECIFIC DESCRIPTION

Figure 1:
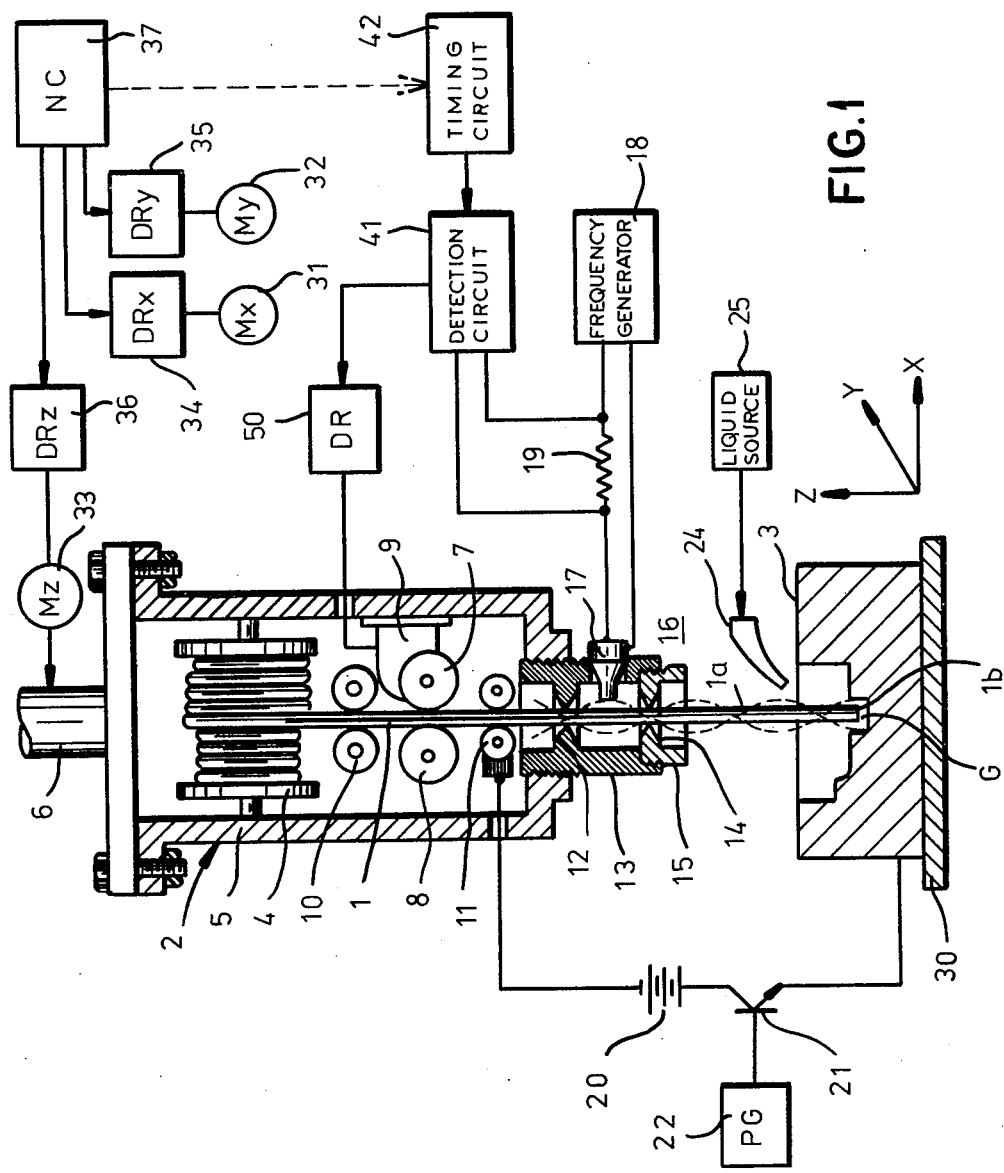
FIG. 1 is a schematic diagram partly in sectional elevational view and partly in block-diagram form illustrating a 3D (three-dimensional) electroerosion machining arrangement using a continuous wire electrode and incorporating the present invention.

Referring first to FIG. 1, the apparatus shown there makes use of a tool electrode 1 in the form of a continuous wire composed of, say, copper and of a thickness of 0.05 to 1 mm. The wire electrode 1 is shown extending from a tool head, generally designated at 2, to present a free end position 1a terminating at a machining electrode face 1b which is spacedly juxtaposed across a machining gap G with a workpiece 3 in which a 3D (three-dimensional) cavity is shown being machined therewith. The continuous electrode wire 1 is shown stored on a drum 4 supported in a housing 5 which forms a part of the tool head 2. The housing 5 is secured to a spindle 6 designed to move the tool head 2 vertically up and down in the direction of a Z-axis along their longitudinal axes. The housing 5 is also shown accommodating a capstan 7 and a pinch roller 8 which hold the wire 1 therebetween and a drive motor 9 for rotating the capstan 7 via a transmission (not shown) to axially displace the wire 1 guided from the drum 4 through a pair of brake rollers 10. A pair of further rollers 11 are arranged to guide the wire 11 to pass slidably through a V-edged opening 12 formed in a cylindrical sleeve 13 securely threaded into the housing 5 and then to pass slidably through a V-edged opening 14 formed in a cup-shaped sleeve 15 securely threaded into the cylindrical sleeve 13. An ultrasonic-horn vibrator 16 is fitted into the sleeve 13 and has its active end disposed in light contact with the wire 1 halfway between the openings 12 and 14.

An erosion machining power supply comprises a DC source 20 connected electrically on one hand to one of the guide rollers 11 in contact with the electrode wire 1 and on the other hand to the workpiece 3. A power switch 21, e.g. a bank of transistors, is provided in the series circuit connecting the DC source 20 to the electrode wire 1 and the workpiece 3 and is controlledly turned on and off by a signal pulser 22 to apply a succession of electrical machining pulses between the electrode wire 1 and the workpiece 3, thereby producing successive electrical discharges between the machining face 1b on the free end portion of the electrode wire 1 and the workpiece 3 across the machining gap G flooded with a machining liquid to electroerosively remove material from the workpiece 3. The machining liquid e.g. a water liquid may be supplied into the machining gap G from one or more nozzles 24 communicating with a liquid source 25.

The workpiece 3 is securely mounted on a worktable 30 displaceable in an X-Y or horizontal plane orthogonal to the vertical or Z-axis by a pair of motors 31 and 32. The motor 31 is adapted to displace the worktable 30 along an X-axis and the motor 31 to displace the worktable 30 along a Y-axis. A further motor 33 is drivingly coupled with the spindle 6 to displace the tool head 2 vertically or along the Z-axis. The motors 31, 32 and 33 are energized by their respective driver circuits 34, 35 and 36 which are furnished with drive signals from a numerical control (NC) unit 37. The latter has numerical data preprogrammed therein defining a path of relative displacement between the machining electrode face 1b and the workpiece 3, the data being reproduced in operation of the apparatus in the form of drive signals for the motors 31, 32 and 33 to displace the machining face portion 1b relative to the workpiece 3 along the preprogrammed path and permitting a desired cavity of the contour defined thereby to be machined in the workpiece 3.

In the arrangement shown, the electrode wire 1 is arranged to project its free end portion 1a of a predetermined constant length 1 and the motor 9 is designed to feed the electrode wire 1 from the storage drum 5 so as to compensate for the wear thereof at the machining face 1b and thus maintain that constant length. It is essential that the electrode free end portion 1a be able to transversely vibrate at a resonant frequency thereof.

The ultrasonic-horn vibrator 16 shown which may be of conventional design includes an electromechanical transducer, e.g. of piezoelectric type, energized by a high-frequency power supply 18 to cause the electrode free end portion 1a to transversely vibrate at a resonant frequency thereof with a small amplitude. A transducer 17 serves to sense the vibrations of the free end portion 1a and is connected via a resistor 19 to a detection circuit 41. For causing the free end portion 1a to transversely vibrate at a resonant frequency thereof, any motor other than the ultrasonic horn vibrator may be used and may be of electromagnetic or electrodynamic type. Similarly, the transducer which converts the mechanical vibration of the free end portion 1a into a corresponding electrical signal may be of electromagnetic, piezoelectric or electrodynamic type. Depending on the motor employed, it will be possible to impress on the free end portion 1a a planar oscillation or a rotary oscillation.

The transverse vibration of the free end portion may be self-sustaining, by amplifying the voltage transmitted by the transducer in an electronic amplifier and transmitting it to the motor at an appropriate phase angle. Another mode of proceeding is to feed the motor from the generator 18 either tuned to or synchronized with the resonant frequency of the free end portion.

The detection circuit 41 is designed to signal a change of one of the physical variables of the vibration of the free end portion 1a caused by erosive wear thereof on the machining electrode face 1b, thus either the amplitude or the resonant frequency thereof.

A timing circuit 42 is also provided to produce checking pulses with a predetermined time interval or in response to command signals from the NC unit 37 to periodically or aperiodically enable the detection circuit 41 to be responsive to the vibration signal developed at the sensing resistor 19.

A signal representing the change in the mode of the vibration caused by wear of the machining electrode face 1b on the free end portion 1a is produced by the detection circuit 41 and applied to a driver circuit 50 for operating the motor 9 which may be a stepping motor or DC motor. The driver circuit 50 may provide the motor 9 with a drive pulse in the form of a single pulse or several pulses tailored to advance the electrode wire 1 by a predetermined small distance calculated to compensate for the wear that occurs. Alternatively, a succession of drive pulses or a continuous drive signal may be furnished to advance the electrode wire 1 until the detection circuit 41 indicates disappearance of the disturbance of the sensing vibration signal or resumption of the preset resonance vibration mode.

The V-edged openings 12 and 14 in the sleeves 13 and 15 fitted into the housing 5 are sized preferably to be in light contact with the passing electrode wire 1 to provide two fixed nodes for a resonant vibration of the free end portion 1a. The distance between the edge of the opening 12 and the edge of the opening 14 is, of course, adjusted by adjusting the threading of the sleeve 15 into the sleeve 13 to lie at a multiple of half the wavelength of a resonant vibration of the free end portion 1a.

For the sake of achieving a greater precision of sensing the electrode wear, it has been found that the free end portion 1a should be transversely vibrated at a given resonant frequency in a higher frequency range.

The frequency should generally be in excess of 0.5 MHz and preferably in excess of 10 MHz.

For example, with a copper electrode wire of 0.2 mm diameter vibrated at a frequency of 1 MHz, the wear can be ascertained with a precision of 1 to 3 microns in length. With the same electrode wire vibrated at a frequency of 20 MHz, the precision is increased to 0.1 to 0.5 microns in length of the worn portion.

Checking pulses may be issued from the timing circuit 42 at a rate of 10 times per second, for example. As long as the free end portion 1a remains vibrating in resonance with the vibration signal applied by the generator 18, the detection circuit 41 issues no output signal. When the resonant frequency changes or the present resonant mode is shifted away as a result of erosive wear of the machining face 1b, the detection circuit 41 responds to a reduced signal at the resistor 19 and issues a drive signal which is applied to the motor 9 to allow the electrode wire 1 to be fed from the drum 9 in compensation for the erosive wear detected. In this manner, the length of the electrode wire 1 projected from the tool head 2 (i.e. of the free end portion 1a) and the length of the machining gap G between the machining electrode face 1b and the workpiece 3 bath tend to be maintained constant. In the arrangement described, it will be noted that this compensatory advance of the electrode wire 1 is conducted independently of z-axis machining feed advance of the machining electrode face 1b through the tool head 2 or the spindle 6 by means of the motor 33.

When the motor 33 is dispensed with or the tool head 2 is held stationary, the driver circuit 50 for the motor 9 is arranged to be responsive both to the Z-axis machining feed command signals from the NC unit 37 and to the electrode-wear compensation advance signal from the detection circuit 41.

Figure 2:
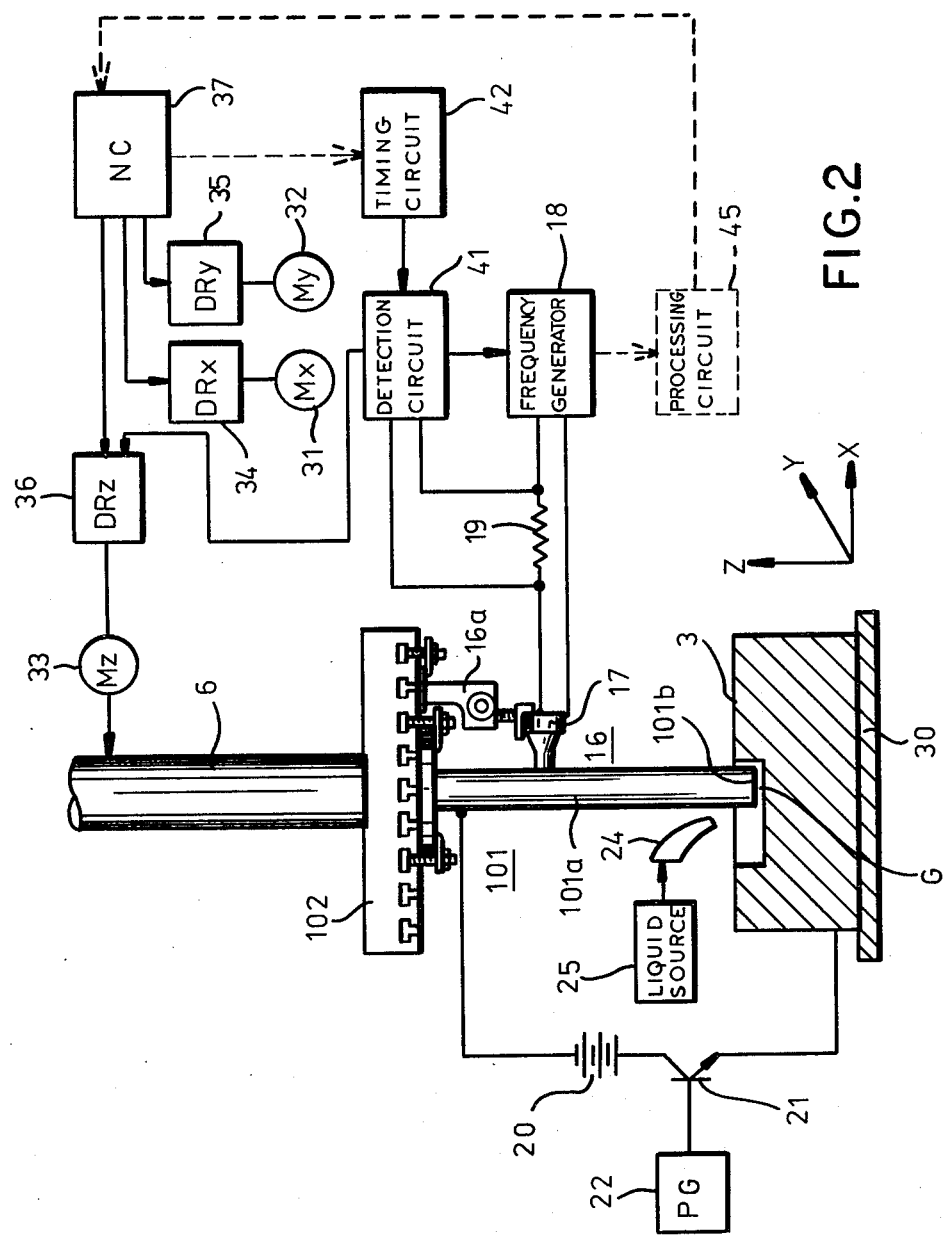
FIG. 2 is a similar diagram illustrating a 3D electroerosion machine using a tool electrode secured to the tool head and incorporating the present invention.

In the embodiment of the invention shown in FIG. 2 in which reference numerals the same as those in FIG. 1 designate the same or similar components, the tool electrode is shown in the form of a cylindrical rod 101 securely attached to the tool head in the form of a plate 102 which is securely supported by the spindle 6. The electrode 101 may here again be composed of copper or its alloy and may have a diameter of 1 to 5 mm, and has a predetermined initial length which constitutes a transversely vibratable free end portion 101a defining a machining electrode face thereof designated at 101b. The ultrasonic-horn vibrator 16 is secured to the tool head 102 by means of an attachment 16a which allows adjustment of its vertical position and, as in the previous embodiment, is held in light contact with the tool electrode 101.

As in the embodiment of FIG. 1, the timing circuit 42 furnishes periodically a detection circuit 41 with a checking pulse to provide periodic monitoring of the vibration signal detected at the sensing resistor 19. In the arrangement of FIG. 2, however, the length of the tool electrode 101 is permitted to decrease progressively as its erosive wear at the machining electrode 101b continues. This entails a progressive change (increase) in the resonant frequency of the tool electrode 101. Thus, each time a preset resonant mode determined at the generator 18 is shifted away, the detecting circuit 41 operates to provide the driver circuit 36 with a wear-compensation signal and at the same time acts on the generator 18 to change the output vibration frequency thereof so as to be tuned with the resonant frequency of the worn length 101a. Thus, the driver circuit 36 is operative to respond to both the wear-compensation signal from the detection circuit 41 and to the Z-axis machining feed command signal from the NC unit 37.

Alternatively, each time a preset resonant mode determined at the generator 18 is shifted away, the detecting circuit 41 acts on the generator 18 to change the output vibration frequency thereof to a next preset value. A signal representing the frequency change is then transmitted to a processing circuit 45 which determines the length of the tool electrode 101a in accordance with preprogrammed instructions and calculates the actual electrode wear corresponding to the shifted frequency. The NC unit 37 is then furnished with a wear signal and acts on the driver circuit 36 by adding the detected amount of wear to a programmed machining feed displacement in the Z-axis component to cause the motor 33 to advance the tool electrode 101 by the summed displacement.

What is claimed is:

1. A method of electroerosively machining a workpiece with a tool electrode, comprising the steps of:
   supporting said tool electrode to bring its free end portion defining a machining electrode face into spaced juxtaposition with the workpiece and to define a machining gap therewith;
   flooding said machining gap with a machining liquid;
   causing said free end portion of the tool electrode to transversely vibrate at a given frequency;
   passing an erosion machining current between said tool electrode and said workpiece to electroerosively remove material from the workpiece while permitting said machining electrode face to erosively wear; and
   sensing the erosive wear of said tool electrode by sensing a change in the mode of said vibrations.

2. The method defined in claim 1 wherein said tool electrode is supported to present said free end portion of a predetermined length, further comprising the step of said causing said free end portion of said length to vibrate at a given resonant frequency thereof.

3. The method defined in claim 2 wherein said frequency is in excess of 0.5 MHz.

4. The method defined in claim 3 wherein said frequency is in excess of 10 MHz.

5. The method defined in claim 2, further comprising the step of, in response to said change in the mode of the vibrations, automatically advancing said tool electrode to maintain said predetermined length of the presented free end portion substantially constant.

6. The method defined in claim 5 wherein said tool electrode is axially advanced by a predetermined distance.

7. The method defined in claim 5 wherein said tool electrode is axially advanced until said presented free end portion resumes vibration at said resonant frequency.

8. The method defined in claim 2, further comprising the step of, in response to said change in the mode of the vibrations, automatically advancing said tool electrode relative to said workpiece to maintain said machining gap substantially constant in size.

9. The method defined in claim 8 wherein said tool electrode is axially advanced relative to said workpiece by a predetermined distance.

10. The method defined in claim 8 wherein said tool electrode is axially advanced relative to said workpiece by a distance which is a function of said change in the mode of the vibrations.

11. The method defined in claim 1 wherein said workpiece is machined to form a cavity therein, further comprising the step of relatively displacing said tool electrode and said workpiece along a predetermined multi-dimensional path corresponding to the contour of said cavity multi-axially in a multi-axis coordinate system including a coordinate axis in coincidence with the axis of said tool electrode; imparting an external vibration signal of a given frequency to said free end portion of the tool electrode to permit it to vibrate transversely in resonance with said external vibration signal and, with an erosive wear of said machining electrode face, to vibrate transversely out of resonance with said external vibration signal; and detecting the disturbance of said resonance to sense said erosive wear of the tool electrode and, in response to said disturbance, advancing said tool electrode relative to said workpiece along said coordinate axis independently of said multi-axial relative displacement.

12. The method defined in claim 11 wherein said tool electrode is supported to present said free end portion of a predetermined length, further comprising the step of causing said free end portion of said length to vibrate in resonance with said external vibration signal.

13. The method defined in claim 12, further comprising the step of, in response to said disturbance of the resonance, automatically advancing said tool electrode along said coordinate axis to maintain said predetermined length of the presented free end portion substantially constant.

14. The method defined in claim 13 wherein said tool electrode is advanced along said coordinate axis by a predetermined distance.

15. The method defined in claim 13 wherein said tool electrode is advanced along said coordinate axis by a distance which is a function of said disturbance.

16. The method defined in claim 13 wherein said tool electrode is advanced along said coordinate axis until said free end portion resumes vibration in resonance with said external signal.

17. The method defined in claim 12 further comprising the step of, in response to said disturbance of the resonance, automatically advancing said tool electrode relative to said workpiece.

18. The method defined in claim 11 or claim 17 wherein the frequency of said external vibration signal is in excess of 0.5 MHz.

19. The method of defined in claim 18 wherein said frequency is in excess of 10 MHz.

20. An apparatus for electroerosively machining a workpiece with a tool electrode, comprising:
a tool head for supporting a tool electrode to bring its free end portion defining a machining electrode face into spaced juxtaposition with the workpiece and to define a machining gap therewith;
means for flooding said machining gap with a machining liquid;
means for causing said free end portion of the tool electrode to transversely vibrate at a given frequency;
power-supply means for passing an erosion machining current between said tool electrode and said workpiece to electroerosively remove material from the workpiece while permitting said machining electrode face to erosively wear; and
electrode-wear sensing means for sensing a change in the mode of said vibrations caused by said wear of the machining face.

21. The apparatus defined in claim 20 wherein said sensing means comprises a transducer for converting the vibrations of said free end portion into a corresponding electrical signal and means for detecting a disturbance of said signal from said transducer caused by said wear of the machining face.

22. The apparatus defined in claim 20 or claim 21, further comprising machining feed drive means for relatively displacing said tool head and said workpiece to cause said machining electrode face to sweep in a scanning manner over said workpiece; means for furnishing machining feed drive signals to said drive means to cause said machining electrode face to sweep along a predetermined path to machine in the workpiece a cavity of contour determined by said path; and means responsive to said sensing means for advancing said tool electrode independently of said machining feed drive signals to compensate for said erosive wear of the machining electrode face.

* * * * *